G. F. BROTT.
STEAM-PLOWS.

No. 185,484. Patented Dec. 19, 1876.

WITNESSES:
W. W. Hollingworth
John C. Kennon

INVENTOR:
Geo. F. Brott
BY
ATTORNEYS.

THE GRAPHIC CO. N.Y.

UNITED STATES PATENT OFFICE.

GEORGE F. BROTT, OF NEW ORLEANS, LOUISIANA.

IMPROVEMENT IN STEAM-PLOWS.

Specification forming part of Letters Patent No. 185,484, dated December 19, 1876; application filed November 15, 1876.

*To all whom it may concern:*

Be it known that I, GEORGE F. BROTT, of New Orleans, parish of Orleans and State of Louisiana, have invented a new and Improved Steam-Plow; and I do hereby declare that the following is a full, clear, and exact description of the same.

The object of the invention is to provide a steam-plow capable of reducing the soil to an approximately pulverulent condition, and which shall, notwithstanding, be of comparatively light draft.

The invention consists in a certain construction and combination of rotary cutters, diggers, and blades, mounted in an adjustable frame. The rotary cutters not only divide the soil into strips or slices, but also assist in propelling the plow or machine. They are placed immediately under the boiler and the axle of the machine, so that nearly the whole weight of the machine may be imposed on them when the nature of the soil requires it.

The diggers are so constructed and arranged as to begin their cut in the slits formed by the rotary cutters, (which precede them,) and continue their cut across the strips or slices into which the rotary cutters have divided the soil. The rotary blades, placed in rear of the diggers, complete the work, producing the effect on the soil of both a harrow and chopper, and thus reducing it to a fine tilth.

Figure 1:
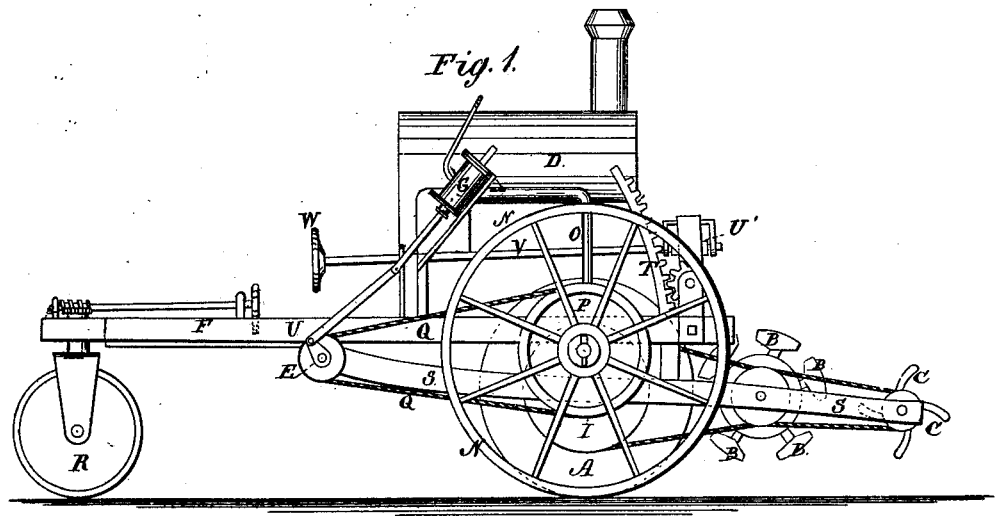
Figure 2:
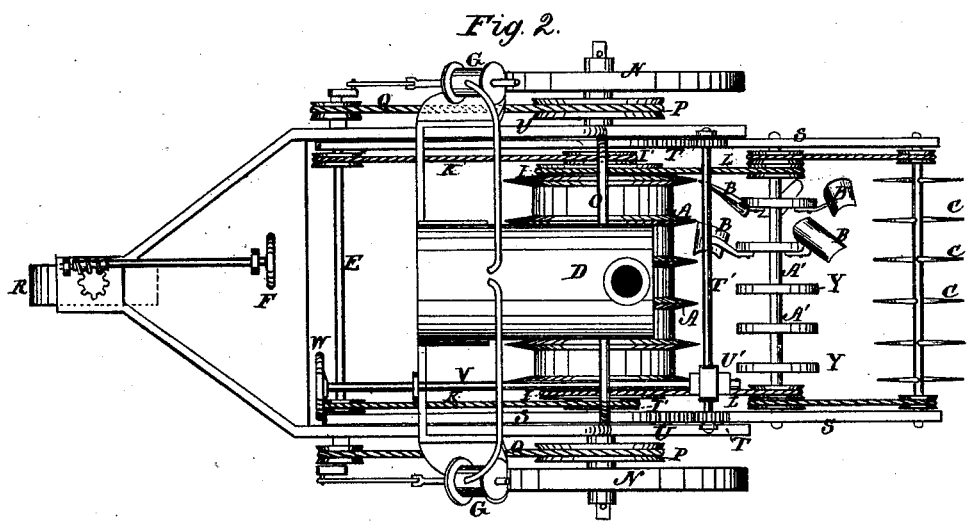
Figure 3:
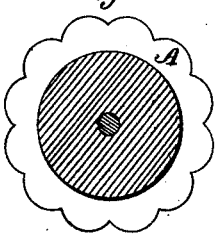
Figure 4:
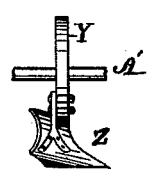

In the accompanying drawing, forming part of this specification, Figure 1 is a side elevation of my improved steam-plow, and Fig. 2 is a plan view of the same. Fig. 3 shows a modification of the form of the circular cutters. Fig. 4 shows the manner of attaching plow-shares in place of rotary diggers.

A indicates the circular cutters, B the rotary or sod cutting and turning devices, and C the rotary cutters or blades, these several devices being arranged in the machine, from front to rear, in the order or succession named. A steam-boiler, D, is placed directly over the circular cutters A, and a crank-shaft, E, is arranged immediately in front of said cutters, at the rear end of the platform F. The crank-shaft is operated by suitable pitman-connection with the pistons of the steam-cylinders G, as shown. The cutter A are in the form of disks with beveled edges, and keyed or otherwise suitably secured upon a shaft at a distance (in practice) of about nine inches apart. The spaces between the cutters are filled by narrow flanged drums, so that the cutters and drums together constitute a larger drum, having annular cutting ribs or teeth.

Large and small chain-pulleys I I' are attached concentrically to each end of the drum. Chains K K connect the small pulleys I' with the crank-shaft E of the engine, and chains L L connect the larger pulleys I with the shaft of the rotary diggers B, which is in turn similarly connected with the shaft of the radial cutters M. Broad-tread transporting-wheels N are mounted loose on the journals of the bent axle O, from which the main frame of the machine is supported. Pulleys P, of nearly the same size as the larger drum-pulleys I, are attached to the wheels N, on the inner side thereof. Rotation is imparted to the said wheels by chains Q, which pass around pulleys on the crank-shaft E. Thus the rotation of the latter causes the rotation of the wheels N, and thereby the advance of the machine, as when proceeding along a highway, or from or to the field, the machine being then supported entirely upon the said wheels N, and a front guiding-wheel, R, the several cutters and diggers being held off the ground by raising the rear end of the supplementary frame S, in which their shafts have their bearings. The said frame is composed of parallel bars which are hinged at their front end to the crank-shaft E, and provided at the middle with vertical rack-bars T, which work in guides *a* attached to the main frame U. These rack-bars mesh with pinions on a cross-shaft, T', which may be rotated to raise or lower the frame S, by means of a worm-gear, U', on a rod or shaft, V. The latter has a hand-wheel, W, attached to its front end, which is in suitable proximity to the platform F, upon which the engineer or operator stands.

The worm and pinions will lock the rack-bars in any adjustment, and thereby hold the frame S elevated or lowered. When it is lowered, the weight of the machine is mainly supported upon the circular cutters, choppers, and diggers or shares and blades, and they are then brought into action upon the soil. Suitable provision is made for removing the supplementary frame S and its attachments, in order to convert the machine into a portable engine to be utilized for various purposes or operations upon the farm. The diggers are essentially rectangular in outline, and the upper left-hand corner is bent or curved inward on the face side. They are also attached to disks Y by means of forked arms, so as to range in spiral lines around the shaft A'.

The form and arrangement of the diggers enable them, as they revolve, to severally make, in regular succession, a diagonal draw-cut across the strips or slices into which the ground has been cut by the circular cutters which precede them, and also to dislodge the pieces so cut and turn them over in the same manner as the mold-board of a plow turns a continuous furrow-slice. The form of the diggers also enables them to clear themselves of the severed pieces of earth, so that they are not impeded in their revolution by carrying up the weight of said pieces, as they would be if made flat or straight on the face.

The diggers begin to cut at one end, and continue to do so until the entire cutting edge has entered the soil, and they at the same time press against the piece being cut, acting thus in the nature of both a colter and plowshare. The diggers are so arranged that they begin their cut in the slits made by the circular cutters, and act upon the sod or earth in the manner of shears upon cloth, the cut being begun by the corner of the digger at one edge of the strip of sod, and gradually carried across the strip, thus severing a piece of sod or earth with comparatively small expenditure of force. The rear cutters or blades are set radially around their shaft, and have a thin curved edge and thick back. They rotate at much higher speed, and following, as they do, immediately behind the diggers, they cut, tear, and pulverize the pieces of soil thrown up by the latter.

From the foregoing description it will be understood that the earth is cut into strips or slices by the circular cutters; that the diggers, following immediately after and rotating more rapidly than said circular cutters, divide the strips, or slices, or sod, or soil into small pieces, which are simultaneously dislodged, raised, and turned over, the diggers operating first as draw-knives, and next as mold-boards or plow-shares. The soil is thus left in condition to be acted on by the radial blades, which, rotating with much greater rapidity than the diggers, divide and tear the pieces cut off by the diggers, and reduce the soil to an approximately pulverulent condition, thus leaving it in fine tilth, and rendering the use of a harrow, or further process of cultivation, entirely unnecessary as a preparation for any kind of crop.

It is apparent that the drum proper will prevent the cutters A sinking too deep in soft earth while cultivating the soil, performing in such case the function of transporting-wheels having a broad tread. To enable the circular cutters to take a better hold in the earth, and have more tractive power without impairing the performance of their function, they may be constructed with a scalloped edge, as shown in Fig. 3. The advance of the machine when at work is caused mainly by the rotation of the rotary diggers or plows, but the circular cutters and blades aid to a certain extent. Thus all the cultivating devices co-operate in propelling the machine in place of retarding it. I am hence enabled to propel the machine with less expenditure of power than has been heretofore required for machines of this class, and no more weight need be sustained by the main transporting-wheels than may be desired, as that can be regulated by the operator or engineer, as before described.

I propose in some cases to detach the diggers B, and substitute plow-shares Z, Fig. 4, the same being all arranged in a straight line parallel to the shaft A', the disks and shaft being prevented from rotating by iron braces resting in the main axle by other suitable means.

What I claim is—

1. The circular cutters projecting from the periphery of the drum which is geared or connected with the driving-shaft, the adjustable frame S, the transporting-wheels, and main frame A, said parts being combined, as shown and described, to operate as and for the purpose specified.

2. The rotary diggers arranged in relation to the circular cutters, as shown and described, so as to begin their cut in the slit made by said cutters, as specified.

3. The combination of the adjustable frame S, hinged at the front end, and carrying the rotary cutters A, diggers B, and blades C, and the rack-bars and worm-gear combined, as shown and described, for the purpose specified.

GEO. F. BROTT.

Witnesses:
 A. W. HART,
 SOLON C. KEMON.